Nov. 10, 1953
S. SPEIL ET AL
2,658,743
MELTING FURNACE
Filed Oct. 21, 1949
2 Sheets-Sheet 2
Fig. 2.
Fig. 3.
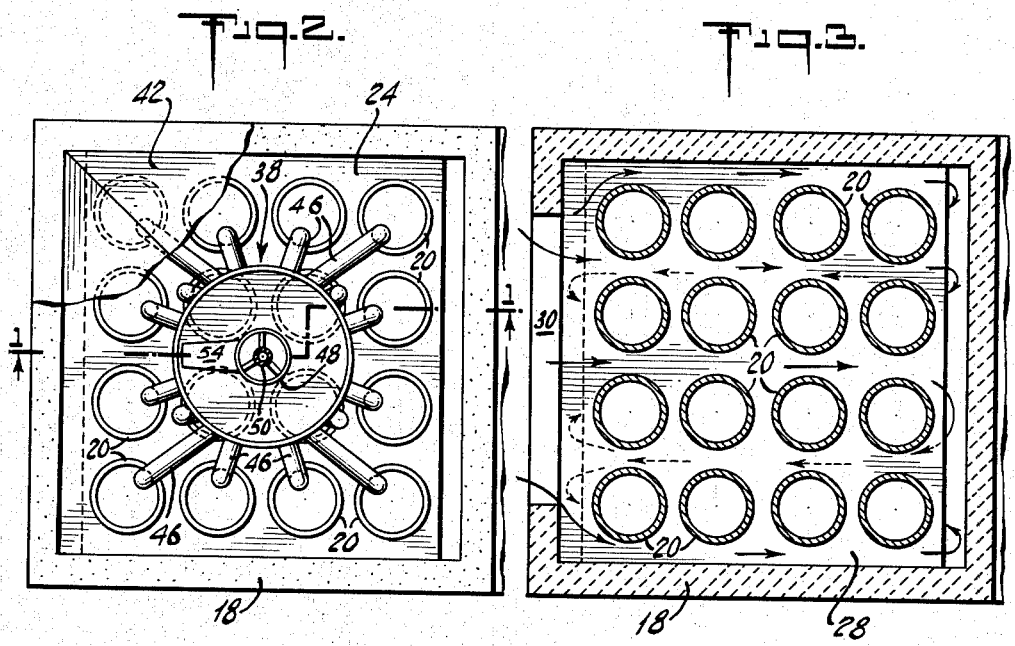
Fig. 4.
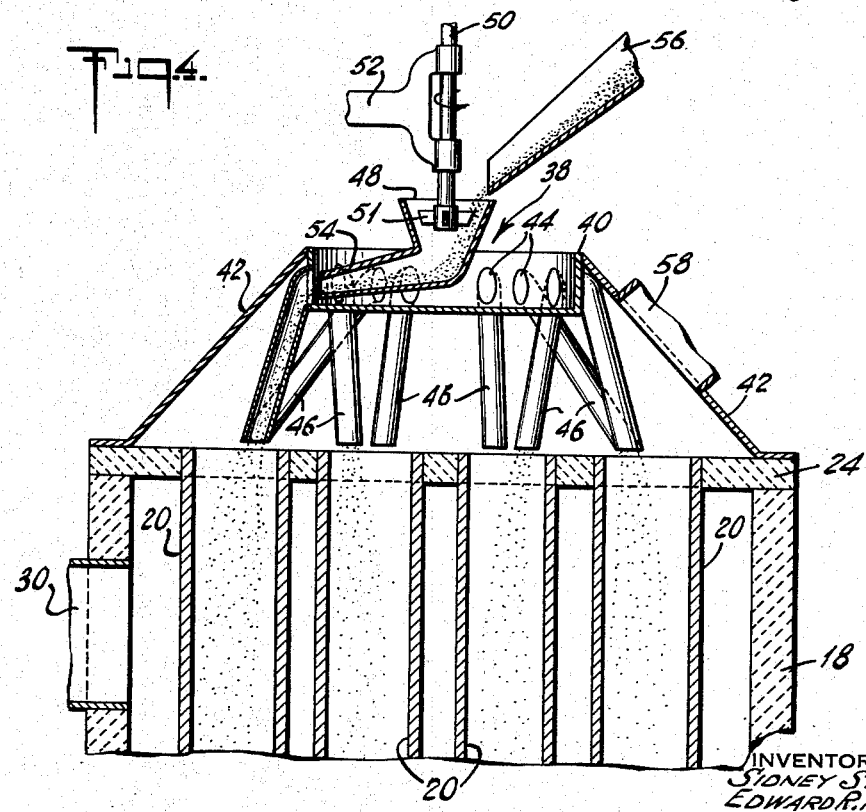
INVENTORS:
SIDNEY SPEIL.
EDWARD R. POWELL.
BY Virgil C. Kline
ATTORNEY:

Patented Nov. 10, 1953

2,658,743

UNITED STATES PATENT OFFICE 2,658,743

MELTING FURNACE

Sidney Speil, Somerville, and Edward R. Powell, North Plainfield, N. J., assignors to Johns-Manville Corporation, New York, N. Y., a corporation of New York Application October 21, 1949, Serial No. 122,764

5 Claims. (Cl. 263—10)

The instant invention relates to improved furnaces particularly for use in melting raw mineral material in the manufacture of mineral wool. The latter term is employed in a generic sense to mean fibrous material formed from slag, rock, glass and other meltable raw materials. A principal object of the invention is the provision of a furnace which will provide a large melting area and intimate contact between the flame and raw material, as compared to the cupolas conventionally employed in this art and which, at the same time will be less expensive in manufacture and maintenance and of higher efficiency than other proposed types such as reverberatory or glass melting furnaces. Another object is the provision of a furnace having the ability to melt furnishes containing easily reducible oxides as contrasted to the conventional cupola.

Another object of the invention is the provision of a melting furnace of improved type which will attain the foregoing objects but which will occupy substantially the same space as a conventional cupola whereby it may be readily substituted therefor in existing plants.

Another object of the invention is the provision of a furnace as referred to above, including means for discharging raw material in finely-divided form through a preheating zone to a combustion and melting chamber to obtain a desired distribution of the preheated material in the chamber.

Another object of the invention is the provision of a furnace including a combustion and melting chamber, a stack above the chamber, a plurality of tubes within the stack and in communication with the chamber for passage of the combustion gases, and means for discharging the unmelted raw material into the tubes adjacent their upper ends whereby the material falls through the tubes counter-current to the flow of combustion gases through the tubes.

A further object of the invention is the provision of a furnace of the above type having a cooling zone between the lower ends of the tubes and the melting chamber to prevent premelting and fusion of the raw material within the tubes.

A still further object of the invention is the provision of a furnace including a combustion and melting chamber with slanting walls, a stack above the chamber containing a plurality of tubes, certain of the tubes being adjacent the walls of the stack, and means for discharging raw, unmelted material in particulate form through the tubes so that material passing through the outermost tubes cascades down the walls of the combustion and melting chamber to reduce heat transfer through the walls.

Briefly stated the invention resides in a furnace having a combustion and melting chamber with at least certain of the walls slanting inwardly. Melting temperatures in the chamber are obtained by a burner extending through one of the side walls. A stack is supported above the chamber, the stack overlying the major area of the chamber. A plurality of tubes are located within the stack, certain of the tubes substantially overlying the slanting side walls of the chamber. Means are provided to deliver the raw material to be melted in finely-divided or particulate form into the tubes, the material falling counter-current to the flow of the hot gases through the tubes and being preheated thereby and distributed in the chamber. To avoid overheating and fusion of the material in the tubes, a cooling zone is located in the path of the combustion gases between the tubes and the chamber. The outer tubes cascade the material down the side walls of the chamber to reduce the transfer of heat therethrough. Preheated combustion air is supplied to the chamber by forcing air in a zigzag path through the stack and around the tubes and into the chamber adjacent the burner.

Our invention will be more fully understood and further objects and advantages will become apparent when reference is made to the following more detailed description of a preferred embodiment of the invention and to the accompanying drawings in which:

Fig. 2 is a top plan view of the furnace, with parts broken away for clearness of illustration;

Fig. 3 is a sectional view, taken on the line 3—3 of Fig. 1; and,

Fig. 4 is a sectional view, similar to Fig. 1 but on an enlarged scale and illustrating only the upper end of the stack and the material distributing means.

Figure 1:
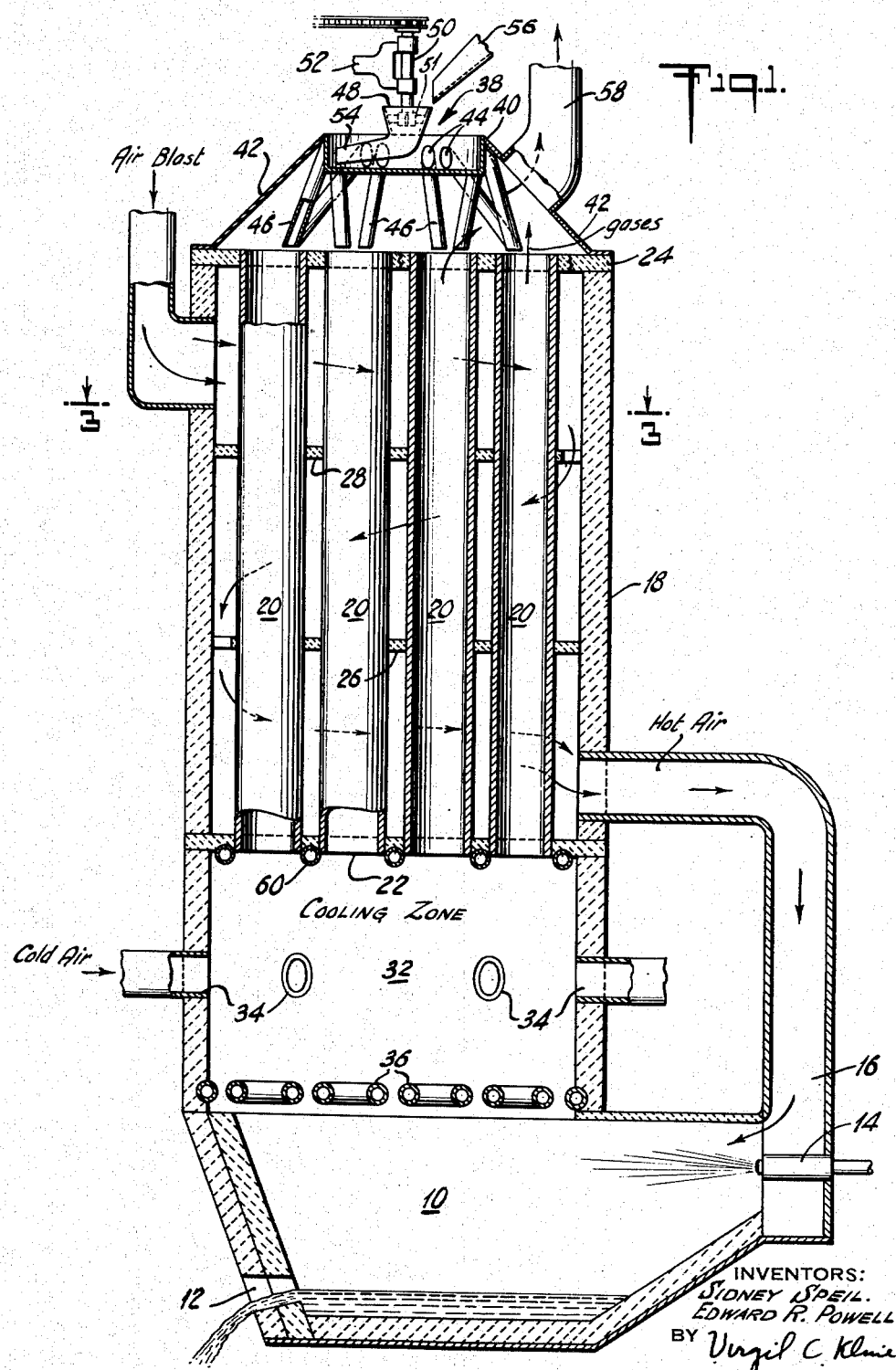
Fig. 1 is a sectional view, taken on the line 1—1 of Fig. 2, illustrating the interior construction of a furnace embodying the instant invention.

Referring now to the drawings, a melting furnace in accordance with the instant invention comprises a melting and combustion chamber 10 defined by inwardly slanting walls lined with a refractory material of any suitable type such as that conventionally used in the art. The chamber includes a tap hole or outlet 12 through which the molten material is discharged as a stream for conversion into fibers by any suitable or conventional means. Preferably opposite the tap hole 12 is a burner 14 adapted to supply a high temperature flame, the burner being connected to any suitable fuel supply (not shown), such as oil, gas or powdered coal. An air duct 16 supplies combustion air to the chamber 10 from a source later described, the air entering around the burner, as illustrated.

A stack indicated in its entirety by the reference character 18 and defined by side walls of the refractory material, is mounted above the chamber 10 and overlies the major area of the chamber, at least the wall of the stack opposite burner 14 being outwardly of the refractory lining of the chamber. A plurality of tubes 20 fixed to headers 22 and 24 inclusive extend longitudinally of the stack, the headers closing the spaces between the tubes and between the tubes and the side walls of the stack. Baffles 26 and 28 are located intermediate the headers at approximately equal spacings from the headers, the baffles partitioning the space in the stack except adjacent one or the other side wall of the stack. As shown in Fig. 1, baffle 26 is spaced from the stack wall adjacent the left-hand side of the furnace, and baffle 28 is spaced from the wall adjacent the right-hand side of the furnace. Air duct 16 connects into the closed portion of the stack adjacent its lower end. A second air duct 30 leads into the closed portion of the stack adjacent its upper end, air duct 30 being connected to any suitable source of air supply, such as a fan, blower, or the like (not shown).

The stack also includes a relatively deep cooling zone 32 for reducing the temperature of the combustion gases below the fusion point of the raw material, the cooling zone being defined by header 22, the side walls of the stack, and the upper boundary of the combustion and melting chamber 10. Air inlets 34 extend through the walls of the stack in the cooling zone to permit the entry of exterior air to the zone. Also, a water screen 36 may be employed as a further cooling medium, the water screen consisting of a plurality of pipes, preferably in the form of a continuous coil, extending across the cooling zone adjacent the lower boundary thereof, the screen being connected to a suitable source of cold water supply and to an outlet to permit cold water to be circulated through the pipe.

Mounted in the upper end of the stack is a distributor indicated generally at 38 for discharging raw material to be melted into the several tubes 20. The distributor includes a pan 40 having a cylindrical side wall. The pan is supported above the upper ends of the tubes, suitably by plates 42 which, together with the pan, form the upper end wall of the stack. The cylindrical side wall of pan 40 is provided with a plurality of ports 44, preferably equally spaced around the wall, one port being provided for each of the tubes 20. Each port is connected to its individual tube by a conduit 46. A feeder 48 is mounted adjacent the lower end of a shaft 50 extending vertically above the center of the pan, the feeder being carried by spider 51. The shaft is supported for rotation by any suitable means (not shown) in bearings on a bracket 52 fixed to any suitable support. The feeder consists of a funnel section and a spout 54 positioned to discharge material into or adjacent ports 44. A chute 56, leading from a supply of the raw material, is supported by means (not shown) in position to discharge raw material into the funnel-like section of the feeder.

A gas exhaust stack 58 extends upwardly from the upper wall of the stack to vent the combustion gases.

In the operation of the furnace described above, a suitable fuel, such as oil, gas, or powdered coal is supplied to burner 14 and ignited to provide a heating flame within the chamber 10. Air for combustion is conveyed to the flame, the air being preheated by being conducted through the stack around the tubes 20 and in the serpentine path defined by the baffles 26 and 28, the air entering the chamber adjacent the burner, through duct 16. The temperature of the chamber is raised to that required to melt the raw material by controlling the intensity of the flame and the amount of combustion air. The hot gases of combustion pass upwardly through the cooling zone 32 and thence through the tubes 20 to the upper end of the stack to escape through vent 58.

The raw material to be melted in crushed or particulate form is discharged from chute 56 into the funnel section of feeder 48. The latter is rotated on shaft 50 at a predetermined rate to move the discharge end of the spout 54 successively from one port 44 to the next. The raw material delivered by the spout moves by gravity through the several conduits 46 and into tubes 20 where it falls counter-current to the flow of the combustion gases into the melting and combustion chamber 10 to be subjected to the high temperature and converted into a molten state to form a pool at the bottom of chamber 10.

The combustion gases rising from the chamber 10 are of such a temperature as to be likely to cause, if no intermediate cooling is provided, premelting and fusion of the particles of the raw material in the tubes 20. To prevent this occurring the cooling zone 32 is provided, into which cold air is introduced from the exterior of the furnace. To further cool the gases water screen 36 is preferably employed. The degree to which the gases are cooled may be readily controlled by controlling the quantity and temperature of the air entering the cooling zone and by controlling the flow and temperature of the water circulated through the water screen. Controls for this purpose have not been shown but may take any suitable or conventional form.

Where particularly high temperatures of the combustion gases are encountered, a second water screen, indicated at 60, may be employed, water screen 60 as is the case with water screen 36, consisting of pipes through which cold water may be circulated. In this instance pipes 60 also preferably serve as supporting bars for the tube structure of the stack, although this is not essential.

Inasmuch as the slanting walls of the combustion chamber, particularly the wall opposite the burner 14, are below the lower ends of the outer tubes 20, powdered raw material is discharged against these walls to cascade down the walls, the material serving to reduce the heat transfer and, hence, loss of heat through the walls.

The construction defined above has the important advantages over conventional mineral wool furnaces of providing a large melting area and intimate contact between the flame and the raw material. Substantially non-reducing conditions are maintained in the furnace and the furnace has the ability to melt furnishes containing easily reducible oxides. Distribution of the raw material throughout the melting area is achieved. In fact, any special distribution may be obtained by increasing the size of selected ports 44 or by otherwise controlling the operation of the distributor. The construction resists slag erosion. Also, it is relatively inexpensive, both with respect to original installation and upkeep, as compared to glass or reverberatory type furnaces. The furnace takes up substantially the same space as the conventional cupola and, hence, may be employed in lieu thereof in existing plants.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. In a furnace for reducing material to molten form, a combustion chamber having a top portion and an opening in the top portion extending over the major area of the chamber, a stack having a hollow, open end first portion connected to said top portion and in communication with the chamber through the opening in said top portion and providing a cooling zone for hot gases of combustion issuing from the chamber, means connected with said first portion for circulating a cooling fluid within said cooling zone, said means including pipes extending across said cooling zone and connected to a source of cooling fluid, said stack having a second portion, said second portion being connected with the first portion, a plurality of tubes supported within said second portion and distributed in spaced relationship throughout its area, each of said tubes having an open first end in communication with the cooling zone and an open second end located remotely from the cooling zone and serving to exhaust combustion gases from the second portion of the stack, means in the stack adjacent the first ends of the tubes closing the second portion of the stack, except for the tubes, against egress of combustion gases through the stack, and means communicating with the second ends of the tubes for distributing unmelted material into said tubes for passage to said combustion chamber in a direction counter-current to the flow of the combustion gases.

2. In a furnace for reducing material to molten form, a walled, hollow vessel providing a combustion chamber and including an upper wall having an opening extending over the major area of the chamber for egress of hot combustion gases from the chamber, a generally hollow stack having a hollow, first portion connected to the upper wall of the chamber adjacent the edges of said opening, said first portion being open at its lower end and communicating with the chamber through said opening, said first portion serving as a cooling chamber, means for introducing cooling air into the cooling chamber, pipes extending across the cooling chamber and connected to a source of cooling fluid, said stack having a second portion, an apertured header extending transversely of the stack and separating the second portion from the cooling chamber, a plurality of tubes within, and distributed in spaced relationship throughout said second portion, each of said tubes having an open lower end of communication with the cooling chamber through an aperture in the header and an open upper end located remotely from the cooling chamber and opening to exhaust from the upper end of the second portion of the stack, and means communicating with the upper end of each tube for distributing unmelted material into said tubes for passage to said combustion chamber in a direction countercurrent to the flow of the combustion gases.

3. The construction defined in claim 2, in which certain of said tubes are located with their open lower ends overlying at least a portion of the side wall area of the combustion chamber, whereby raw material is discharged against, and cascades down said wall area to reduce heat transfer through the walls.

4. The construction defined in claim 3 in which the means for distributing unmelted material into said tubes comprises a pan, means spaced at intervals around said pan and having passages in communication with the interior of said pan and the upper ends of said tubes, a spout having an open discharge end and an open material-receiving end, means for supplying unmelted material to said material-receiving end, and means supporting said spout for rotation within said pan, said discharge end communicating successively with said passages in the course of its rotation to deliver unmelted material to said passages.

5. The construction defined in claim 2, including further a source of air connected to the upper end of the second portion of the stack to supply an air blast to the interior of the stack, an apertured header extending transversely of and closing the upper end of the upper portion of the stack except against the egress of combustion gases, the upper ends of said tubes discharging to exhaust through the apertures in the last-mentioned header, means in the second portion of the stack for circulating the air blast around and between said tubes, and means communicating with the interior of said second portion at its lower end and with the interior of the combustion chamber to provide a passage for the air blast to the combustion chamber.

SIDNEY SPEIL.
EDWARD R. POWELL.

References Cited in the file of this patent

UNITED STATES PATENTS

| Number | Name | Date |
|---|---|---|
| Re. 20,828 | Powell | Aug. 16, 1938 |
| 691,648 | Mitchell | Jan. 21, 1902 |
| 905,117 | Swindell | Nov. 24, 1908 |
| 1,481,348 | Chapman | Jan. 22, 1924 |
| 1,871,863 | Stansfield | Aug. 16, 1932 |
| 2,131,599 | Shrum | Sept. 27, 1938 |
| 2,523,835 | Lepersonne | Sept. 26, 1950 |

FOREIGN PATENTS

| Number | Country | Date |
|---|---|---|
| 460,846 | Germany | May 16, 1928 |
| 139,665 | Austria | Dec. 10, 1934 |